Figure 1:
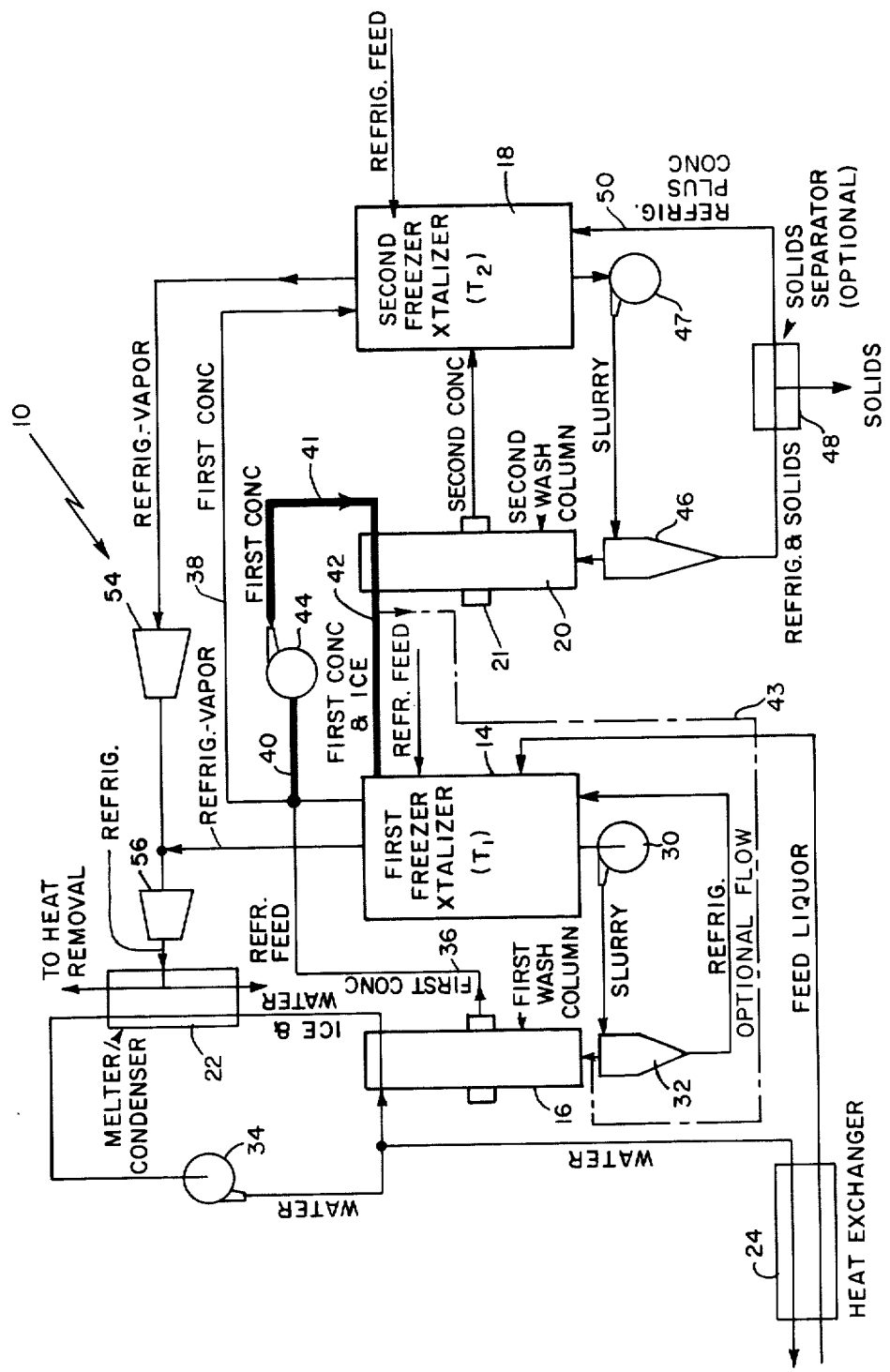

United States Patent [19]
Campbell

[11] 3,885,399
[45] May 27, 1975

[54] MEANS FOR AND METHOD OF PURIFYING CONTAMINATED WATER

[76] Inventor: Robert J. Campbell, Salem, N.H.
[22] Filed: Mar. 27, 1973
[21] Appl. No.: 345,427

[52] U.S. Cl. .................................. 62/123; 62/58
[51] Int. Cl. ............................................ B01d 9/04
[58] Field of Search ...................... 62/58, 123, 124

[56] References Cited
UNITED STATES PATENTS

| | | | |
|---|---|---|---|
| 2,354,633 | 7/1944 | Bedford | 62/123 X |
| 2,552,523 | 5/1951 | Cunningham | 62/123 X |
| 3,269,136 | 8/1966 | Shudi Umano | 62/123 |
| 3,283,522 | 11/1966 | Ganiaris | 62/58 |
| 3,541,804 | 11/1970 | Wiegandt et al. | 62/58 |

OTHER PUBLICATIONS
"First International Symposium on Water Desalination," Oct. 3–9, 1965, Washington D.C.

*Primary Examiner*—William F. O'Dea
*Assistant Examiner*—Peter D. Ferguson
*Attorney, Agent, or Firm*—Charles M. Hogan, Esq.; Abraham Ogman, Esq.

[57] ABSTRACT

The invention is directed to an apparatus and method of purifying contaminated water by means of a two-step freeze crystallization process. The method and apparatus overcomes the serious problem caused by the freezing of water on the screen of the wash column. The solution comprises means and method of reducing the temperature difference between the concentrate and the wash water in the wash column.

13 Claims, 1 Drawing Figure

3,885,399

MEANS FOR AND METHOD OF PURIFYING CONTAMINATED WATER

DEFINITIONS

Contaminated water shall mean sea water, brackish water, industrial waste water or chemical process streams containing salts or other chemicals in suspension or solutions. While this discussion will deal with aqueous solutions, the process will work where non-aqueous solvents are involved and such non-aqueous solvents can be freeze crystallized.

Concentrate shall mean the liquid in the slurry supplied to a wash column or the liquid removed through the screen of a wash column in a freeze crystallization apparatus. Concentrate may be brine or liquor of industrial waste.

Dilute or concentrated shall refer to the percentage of impurities, salt, or contaminants in a concentrate.

Desalination of sea water by the freeze crystallization process is well known. See U.S. Pat. No. 3,587,859. Generally, freeze desalination is accomplished in a single stage apparatus. Where the freezing point of the slurry supplied to a wash column is less than about 24°F, a single stage freeze desalination apparatus breaks down because water freezes on the screen of the wash column. A frozen screen generally upsets the delicate balance of operating parameters of the wash column bringing the purification process to a halt.

Known methods of keeping the screen from freezing, such as heating the screen, fall short of practicability because the power required to prevent the freezing is a serious burden on the overall efficiency of the apparatus. In an extreme case, it may not be possible to reliably prevent freeze-up.

The freezing process on the screen of the wash column in a single stage apparatus originates with the use of pure water to wash the ice crystals emerging from the concentrate. Where the temperature difference of the wash water and the concentrate in the entering slurry exceeds about 8°F, the tendency of the wash column to freeze overtaxes known means for keeping the screen from freezing.

The problem associated with screen freeze-up occurs even in prior art two-stage processes, primarily because heretofore both stages used pure wash water. Whereas it is normally possible to prevent freeze-up in the stage with the dilute concentrate, the stage operating with the lower temperature concentrate tends to freeze. The reason, of course, is clear. Since the freezing point of highly contaminated water is lower than the freezing point of the relatively dilute concentrate, the temperature difference in the wash column handling the more concentrated brine is higher.

It is an object of the invention to provide a means for purifying contaminated water by a freeze crystallization method that avoids the limitations and disadvantages of prior art apparatus.

It is still another object of the invention to provide a two-step apparatus for purifying contaminated water which avoids the disadvantages and limitations of prior art apparatus.

It is yet another object of the invention to provide a two-stage apparatus for purifying contaminated water by a freeze crystallization process which avoids the very serious problem of water freezing on the screen of the wash column by reducing the temperature difference between the wash water and concentrate in the affected wash column.

It is yet another object of the invention to provide a two-stage apparatus for purifying contaminated water by freeze crystallization processes, wherein the threat of freeze-up on the screen of the wash column is removed by utilizing relatively dilute concentrate from one stage as wash water for the stage that contains the concentrated concentrate.

It is still another object of the invention to provide an apparatus and method of purifying water by freeze crystallization processes wherein contaminated water is used as wash water in a wash column to lower the temperature difference between the wash water and the concentrate in the column to prevent water from freezing on the screen.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawing, in which:

FIG. 1 is a block representation of a two-stage freeze crystallization water purifying apparatus embodying the principles of the present invention.

Referring to FIG. 1, the two-stage water purifying apparatus 10 comprises a first freezer-crystallizer 14 and a complementary first wash column 16. The second stage of the apparatus 10 includes a second freezer-crystallizer 18 and its complementary second wash column 20.

In addition to sundry ancillary equipment that will be described hereinafter, the apparatus 10 includes a common melter condenser 22 and a common heat exchanger 24, which service both stages.

The process will be described in terms of removing salts from industrial waste. It should be understood, however, that the apparatus and process will work equally well for desalination of sea water or to purify brackish water and the like.

The typical known freeze crystallization purifying process may be described by referring to the first stage of the FIG. 1 apparatus. Briefly, the contaminated feed, which may be brackish water, industrial waste or sea water, is fed through the heat exchanger 24 to the first freezer-crystallizer 14. The relatively dilute feed mixes with an immiscible secondary refrigerant within the first freezer-crystallizer 14. As the refrigerant evaporates it cools the feed liquor forming a slurry of pure ice crystals in a relatively dilute concentrate. The slurry is pumped by means of pump 30 to a cyclone 32 from which a refrigerant-rich, ice-free underflow is returned to the first freezer-crystallizer 14. The overflow ice slurry, now relatively free of refrigerant, is piped to the first wash column 16.

In the wash column, the slurry is separated, in a conventional way, into its pure ice and relatively dilute concentrate components. The pure ice at the top of the first wash column 16 is washed by pure water pumped from the melter condenser 22 by pump 34 to the first wash column 16. The mixture of pure ice and pure water is removed from the wash column and piped to the melter condenser 22. Here the ice is melted. The pure water is removed through heat exchanger 24.

The one-stage process described above for purifying contaminated water is virtually repeated in a two-stage apparatus. The principal difference between the two-stage apparatus and the single stage apparatus is that the feed for the second stage is the relatively dilute concentrate produced in the wash column of the first stage. See flow lines 36 and 38 in FIG. 1.

Generally, the problem associated with freeze-up on the screen occurs in the second stage wash column since the second concentrate produced in this wash column contains a higher percentage of contaminants and, therefore, has a freezing point substantially lower than the freezing point of the relatively dilute concentrate produced in the first stage wash column. Since the second stage wash column in prior art apparatus and methods utilize pure wash water, it follows that there is a greater temperature difference between the pure wash water and the concentrated concentrate in the second stage wash column than occurs between the pure wash water and the relatively dilute concentrate produced in the first stage column. As was pointed out previously, the freezing tendency increases as this temperature difference increases.

The portion of the two-stage apparatus 10 shown in FIG. 1, incorporating the inventive concept, is depicted by the heavy flow lines 40, 41 and 42. Simply, instead of using pure water from the melter condenser 22 to wash the ice crystals formed in the second wash column 20, a portion of the first concentrate is supplied to a pump 44 and supplied through the flow lines 40, 41 and 42 to the second wash column 20. The first concentrate mixes with the ice crystals formed in the second wash column 20 and is pumped from the second wash column 20 with the ice crystals harvested therein via the flow line 42 to the first freezer-crystallizer 14 and is mixed with the feed liquor and refrigerant contained therein.

The temperature of the first freezer-crystallizer is at the temperature $T_1$ corresponding to the freezing point of the feed liquor. The temperature of the second concentrate in the second wash column 20 is at the temperature $T_2$ corresponding to the freezing point of the slurry entering the second wash column 20 which includes a mixture of first concentrate and second concentrate in the second freezer-crystallizer 18 and ice crystals. Since the temperature $T_1$ is lower than the temperature of pure wash water, it follows that the temperature difference between $T_1$ and $T_2$ in the second wash column 20 is less than the temperature difference that occurs in prior art apparatus using pure wash water in the second stage. The temperature difference between $T_2$ and $T_1$ is easily adjusted by controlling the concentration of the first concentrate for example, to lie within the range necessary to prevent the screen of the second wash column 20 from freezing. Thus, the relatively simple expedient of substituting the first concentrate for the pure wash water in the second stage wash column avoids the heretofore horrendous problem associated with freeze-up of the screen in the second wash column.

The second wash column 20 may be operated in one of two ways. The first concentrate entering the second wash column may be used to wash the ice crystals. In this case, a relatively small amount of first concentrate will mix with the second concentrate at the screen 21 and flow out together to the second freezer-crystallizer 18.

Alternatively, the first concentrate may be used to wash or displace the second concentrate at or near the ice harvesting level of the wash column. Thus, the level of second concentrate completely covers the screen 21, eliminating any temperature difference, consequently eliminating freeze-up at the screen 21. The interface between wash water and concentrate in the second wash column occurs above the screen, and preferably at or near the harvesting level under these conditions. Consequently, freezing, if any, occurs in an innocuous location.

Though not preferred, it may be possible to use pure wash water or water with very low contamination as wash water under these circumstances. Operation by this alternative method eliminates completely the potential for freezing at the screen and the difference in temperature of the two brines ceases to be a limitation on the process. Having solved this problem, it is now possible to operate the second stage at the eutectic freezing point of the feed liquor or contaminated water so that the dissolved solids come out of solution and may be optionally removed.

Salts coming out of solution usually remain in suspension. Salts in suspension may be removed from the second stage. The slurry produced in the second freezer-crystallizer is pumped to the cyclone 46 by means of the pump 47. The ice-free underflow from the cyclone 46 comprises a mixture of refrigerant and concentrate, the latter containing solids in suspension. The refrigerant-rich concentrate is supplied to a solids separator 48 wherein the suspended solids are removed and the refrigerant and remaining liquid is returned via flow line 50 to the second freezer-crystallizer 18. In a similar manner, salts which may precipitate in or prior to the first stage freezer may also be removed.

If a single stage, rather than a multi-stage cyclone is used, some concentrate will generally be returned to the freezer-crystallizer with the refrigerant or the refrigerant-solid, as the case may be.

If the concentrate-ice output from the wash column 20 is a slurry suitable for use by the first wash column 16, it may be piped directly to the first wash column 16 via phantom line 43. This will result in a savings in energy as this slurry from the wash column 20 is at a higher pressure than the slurry formed in the freezer-crystallizer.

To complete the picture, the compressor 54 at the top of FIG. 1 compresses refrigerant vapor removed from the second freezer-crystallizer 18 and its output is mixed with refrigerant vapor from the first freezer-crystallizer 14 and piped to compressor 56 where it is further pressurized. The further pressurized refrigerant is supplied to the melter condenser 22 where its heat is transferred to the ice crystals and wash water coming from the first wash column 16. The condensed refrigerant is then recycled to the first and second freezer-crystallizers 14 and 18, respectively, optionally or as needed to make up for losses.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. An apparatus for purifying contaminated water by freeze crystallization comprising:
   a. a first stage including a first freezer-crystallizer and wash column subassembly for treating contaminated water and producing a first concentrate;
   b. a second freezer-crystallizer and wash column subassembly for treating said first concentrate and producing pure ice crystals and a second concentrate in the second wash column, said second freezer-crystallizer being coupled to said first wash column to receive first concentrate, and to said second wash column to receive second concentrate, said second wash column being coupled to said first wash column for receiving and utilizing said first concentrate to wash said ice crystals in said second wash column to form a mixture of first concentrate and ice crystals; and
   c. means for returning at least a portion of said mixture of ice crystals and first concentrate from said second wash column to said first stage.

2. An apparatus as described in claim 1 including means wherein said mixture of ice crystals and first concentrate are returned to the first freezer-crystallizer.

3. An apparatus as described in claim 1 including means wherein said mixture of ice crystals and first concentrate are returned to the first wash column.

4. An apparatus as described in claim 1 including means wherein a portion of said first concentrate washes said ice crystals and mixes with said second concentrate in said second wash column.

5. An apparatus as described in claim 1 including means wherein the level of second concentrate in said second wash column is adjusted to maintain a substantially constant temperature across the screen in the second wash column.

6. An apparatus as described in claim 1 which includes means for separating solids from said second concentrate.

7. An apparatus for purifying contaminated water by freeze crystallization comprising:
   a. a first stage including a first freezer-crystallizer and wash column subassembly for treating contaminated water and producing a first concentrate;
   b. a second freezer-crystallizer and wash column subassembly for treating said first concentrate and producing pure ice crystals and second concentrate in the second wash column, said subassembly including means coupling said second freezer-crystallizer to said first wash column to receive said first concentrate, means coupling said second freezer-crystallizer to said second wash column to receive said second concentrate, means for coupling said second wash column to said first wash column for receiving and utilizing said first concentrate for washing said ice crystals to form a mixture of first concentrate and ice crystals, and means for coupling a slurry of said second concentrate and ice crystals to the input of said second wash column; and
   c. means for piping the mixture of ice crystals and first concentrate to said first stage.

8. An apparatus as defined in claim 7 including means wherein the mixture of ice crystals and first concentrate are returned to the first freezer-crystallizer.

9. An apparatus as defined in claim 7 including means wherein the mixture of ice crystals and first concentrate are returned to the first wash column.

10. An apparatus for purifying contaminated water by freeze-crystallization as defined in claim 7 which includes in addition means for removing suspended solids from said slurry.

11. An apparatus for purifying contaminated solvent by freeze crystallization comprising:
    a. a first freezer-crystallizer and wash column subassembly for treating contaminated solvent and producing a first concentrate;
    b. a second stage including a second freezer-crystallizer and wash column subassembly for treating said first concentrate and producing pure solvent crystals and a second concentrate in the second wash column, said second freezer-crystallizer being coupled to said first wash column to receive said first concentrate, and to said second wash column to receive second concentrate, said second wash column being coupled to said first wash column for receiving and utilizing said first concentrate to wash said solvent crystals to form a mixture thereof; and
    c. means for returning at least a portion of said mixture of solvent crystals and first concentrate to said first stage.

12. An apparatus as defined in claim 11 including means wherein the mixture of solvent crystals and first concentrate are returned to the first freezer-crystallizer. Avco Corporation 02 Cincinnati OH 13. An apparatus as defined in claim 11 including means wherein the mixture of solvent crystals and first concentrate are returned to the first wash column.

* * * * *